United States Patent [19]

Vernon

[11] 4,112,433

[45] Sep. 5, 1978

[54] MENISCUS DAMPENING DROP GENERATOR

[75] Inventor: Richard H. Vernon, Richardson, Tex.

[73] Assignee: Xerox Corporation, Stamford, Conn.

[21] Appl. No.: 800,833

[22] Filed: May 26, 1977

Related U.S. Application Data

[63] Continuation of Ser. No. 634,315, Nov. 21, 1975, abandoned.

[51] Int. Cl.[2] ........ G01D 15/16

[52] U.S. Cl. ........ 346/1; 310/317; 346/140 R

[58] Field of Search ........ 346/140 R, 75, 1; 310/317, 323

[56] References Cited

U.S. PATENT DOCUMENTS

| | | | |
|---|---|---|---|
| 3,683,212 | 8/1972 | Zoltan | 346/140 X |
| 3,747,120 | 7/1973 | Stemme | 346/140 X |
| 3,832,579 | 8/1974 | Arndt | 346/140 X |
| 3,848,118 | 11/1974 | Rittberg | 346/140 X |
| 3,946,398 | 3/1976 | Kyser | 346/140 X |
| 4,024,544 | 5/1977 | Vernon | 346/140 X |

*Primary Examiner*—Joseph W. Hartary

[57] ABSTRACT

A first pressure increase is effected in liquid in a pressure chamber to express liquid droplets therefrom. A time-delayed second pressure increase is effected in liquid in the same pressure chamber to effect a pressure front timed to arrive within an effective meniscus dampening vicinity of a droplet orifice at substantially the same instant that the droplet leaves the orifice to dampen substantially the full period of meniscus vibration.

13 Claims, 10 Drawing Figures

MENISCUS DAMPENING DROP GENERATOR

This application is a continuation of U.S. application, Ser. No. 634,315, filed Nov. 21, 1975, now abandoned.

DESCRIPTION OF THE INVENTION

When an ink droplet is expressed from a droplet outlet orifice, the new meniscus formed in the orifice, after the droplet leaves the same, vibrates until it reaches a stable condition. Since the meniscus must be stabilized in order to express controlled droplets, this period of vibration affects the frequency in which the droplets can be expressed through the orifice. The longer the period of vibration, the lower the frequency or the shorter the period of vibration, the higher the frequency.

It is an object of this invention to provide an ink jet with a meniscus dampening means, which shortens the time of meniscus vibration and thereby increases the freqency in which droplets may be expressed through the outlet orifice.

Other objects of the invention will become apparent from the following description with reference to the drawings wherein.

Figure 1:
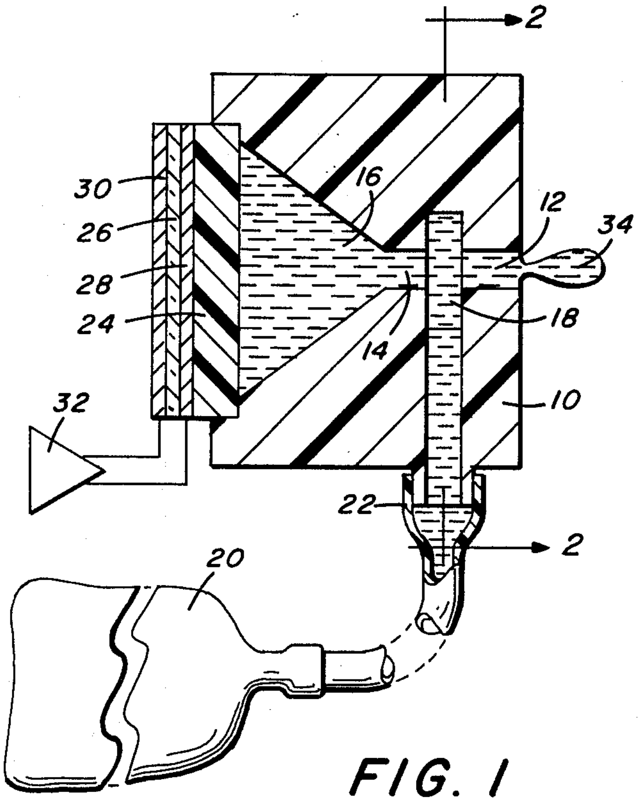
FIG. 1 is a sectional view of an ink jet assembly.
Figure 2:
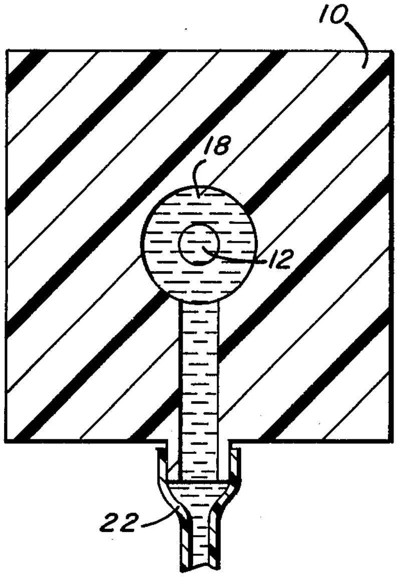
FIG. 2 is a view taken along section line 2—2 of FIG. 1.

Referring to FIGS. 1 and 2, a prior art ink jet assembly is illustrated comprising a housing 10 having an ink jet outlet orifice 12, which is aligned with an outlet passage 14 of a pressure chamber 16. A circular fluid supply chamber 18 is interposed between the outlet orifice 12 and the pressure chamber outlet passage 14. A flexible bag 20 serves as an ink reservoir and is communicated to the passage 18 by a conduit 22. The cross-sectional area of the passage 14 is the same (but not necessarily) as the cross-sectional area of the orifice. A thin, flexible membrane 24 is sealed to the housing 10 and forms an outer wall of the chamber 16. The membrane 24 has attached thereto a plate 26 with piezoelectric properties, which is sandwiched between and bonded to a pair of electrodes 28 and 30 with the electrode 28 being bonded to the membrane 24. The piezoelectric plate 24 is polarized during the manufacture thereof to contract in a plane parallel to the plane of a membrane 24 when excited by applying a proper voltage across the electrodes 28 and 30. The contraction of the piezoelectric plate 26 will exert a likewise stress on the membrane 24 to cause the membrane to deform or buckle to decrease the volume of the chamber 16. An "or" power amplifier 32 is connected to the electrodes 28 and 30 for applying a voltage thereacross.

The above described prior art embodiment is very similar to the ink jet assembly described in Stemme U.S. Pat. No. 3,747,120. Upon activation of the piezoelectric plate 26, the membrane 24 deflects to generate a pressure increase in the fluid in chamber 16, which results in an ink droplet 34 being expressed from the orifice 12.

Figure 3A:
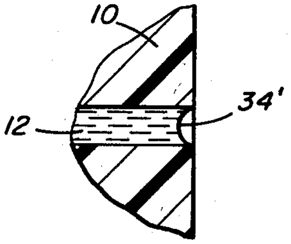
FIG. 3A–3E are views showing the progressive shape of a meniscus prior to and after an ink droplet is expressed from an orifice.
Figure 3B:
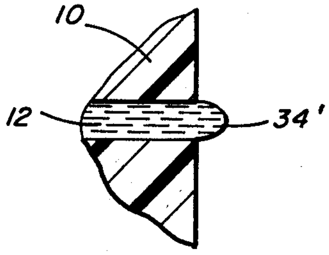
Figure 3C:
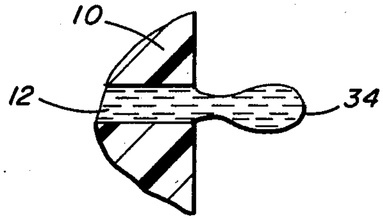
Figure 3D:
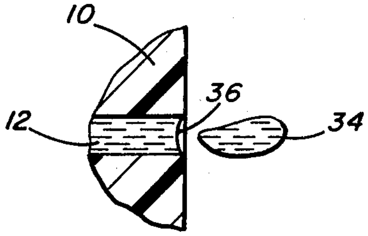
Figure 3E:
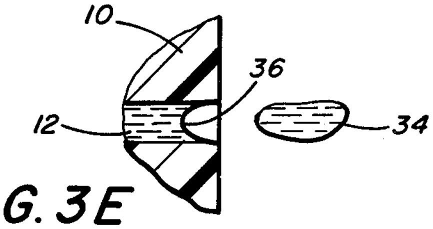

Referring to FIGS. 3A–3E, a typical meniscus to droplet shape diagram is illustrated with respect to a time lapse following a generation of pressure in the fluid in pressure chamber 16. FIG. 3A illustrates the typical shape of a meniscus 34' at the time an electrical signal is transmitted to the piezoelectric crystal to apply a pressure pulse on the liquid in chamber 16. FIG. 3B illustrates the shape of the meniscus 34' at the termination of the electrical signal. FIG. 3C illustrates the shape of the meniscus 34', which has now been elongated and is about ready to break away from the orifice 12 as a droplet 34 (FIG. 3D). FIG. 3D illustrates the droplet 34 as it leaves the orifice 12 and also illustrates a newly formed meniscus 36. When the voltage applied across the electrodes 28 and 30 is terminated thereby relaxing the piezo-electric crystal 26 and the membrane 24, the membrane will return to its normal position creating a pressure decrease in pressure chamber 16, which causes fluid in supply chamber 18 to be drawn into the chamber 16. However, this pressure decrease also is applied to the fluid in the orifice 12, which causes the meniscus 36 to be drawn back into the orifice as illustrated in FIG. 3E. The meniscus 36 will vibrate back and forth until it reaches a stable condition whereupon it will take the position as shown for meniscus 34' in FIG. 3A. The amplitude or degree of this vibration of meniscus 36 limits the frequency response for the ejection of ink through the same orifice 12 since the meniscus 36 must reach a sufficiently stable condition before expression of another controlled droplet. For instance, if it takes 300 microseconds for the meniscus 36 to reach a sufficient stable condition, then electrical pulsing must take place at no less than 300 microsecond intervals for subsequent ejection. Also, there is a possibility of ingestion of air into the system if the meniscus vibration amplitude is too large. While the prior art embodiment discloses an ink jet with a fluid rectifier 18 for supplying fluid to the chamber 16, the same meniscus vibration characteristic is applicable to ink jets, which do not have a fluid rectifier as, for instance, ink jets similar to those disclosed in Zoltan U.S. Pat. No. 3,683,212 and Arndt U.S. Pat. No. 3,832,579.

It is the purpose of the instant invention to dampen the meniscus vibration amplitude and thereby decrease the time of meniscus stabilization resulting in increasing the ink droplet expression frequency and also preventing the ingestion of air into the system. This is accomplished by applying a voltage to the piezoelectric plate 26 at a predetermined time after the application of the first voltage thereto to effect a second pressure increase in the chamber 16. This second pressure increase effects a pressure front, which arrives within an effective meniscus dampening vicinity of the orifice 12 at substantially the same instant that the droplet 34 leaves the orifice 12. The pressure front dampens substantially the full period of meniscus vibration until the meniscus reaches a sufficiently stabilized condition. The voltage magnitude and duration will be less than that of said first voltage and is such that the second pressure increase in the liquid in the chamber 16 will not be of a magnitude to express an ink droplet through orifice 12 but yet will dampen substantially the full period of meniscus vibration. The time delay between applying the first and second voltages to the piezoelectric plate will be determined by the hydraulic design of the ink jet system with the second voltage being applied after substantial decay of the first voltage. For instance, it has been found under the following conditions that the period for sufficient meniscus stabilization can be shortened from approximately 300 microseconds to 200 microseconds with the meniscus having a natural vibration frequency of 2.5 kHz. The initial voltage applied to a piezoelectric plate to express a droplet was 100V for 30 microseconds while a second voltage of 60V for 20 microseconds was applied to the piezoelectric plate 160 microseconds after the initiation of the first voltage to dampen the meniscus vibration.

Figure 4:
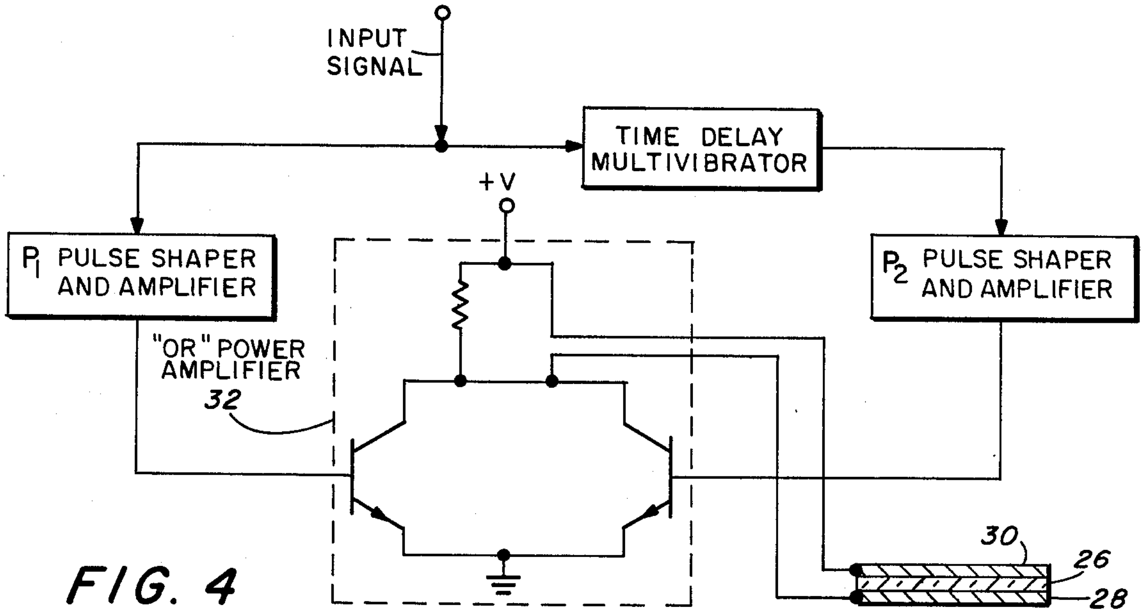
FIG. 4 is a schematic of an electrical flow diagram.

Referring to the electrical schematic of FIG. 4, one portion of an input signal passes through a pulse shaper amplifier $P_1$ to the "or" power amplifier 32 and then to the electrodes 28 and 30 to apply a first voltage to the piezoelectric plate of a given magnitude and for a give period. The other portion of an input signal passes through a time-delay multivibrator, a pulse shaper amplifier $P_2$ to the "or" power amplifier 32 and then to the electrodes 28 and 30 to apply a time-delayed second voltage of a smaller magnitude and for a shorter duration than the first voltage. The pulse shaper amplifiers $P_1$ and $P_2$ are well known and include components to vary the rise time, fall time, voltage amplitude and electrical pulse width. The "or" power amplifier 32 may comprise two transistors each driven between a non-conducting state and a state of saturated conduction in response to positive-going pulse-like input signals supplied to the base of the transistor.

Figure 5:
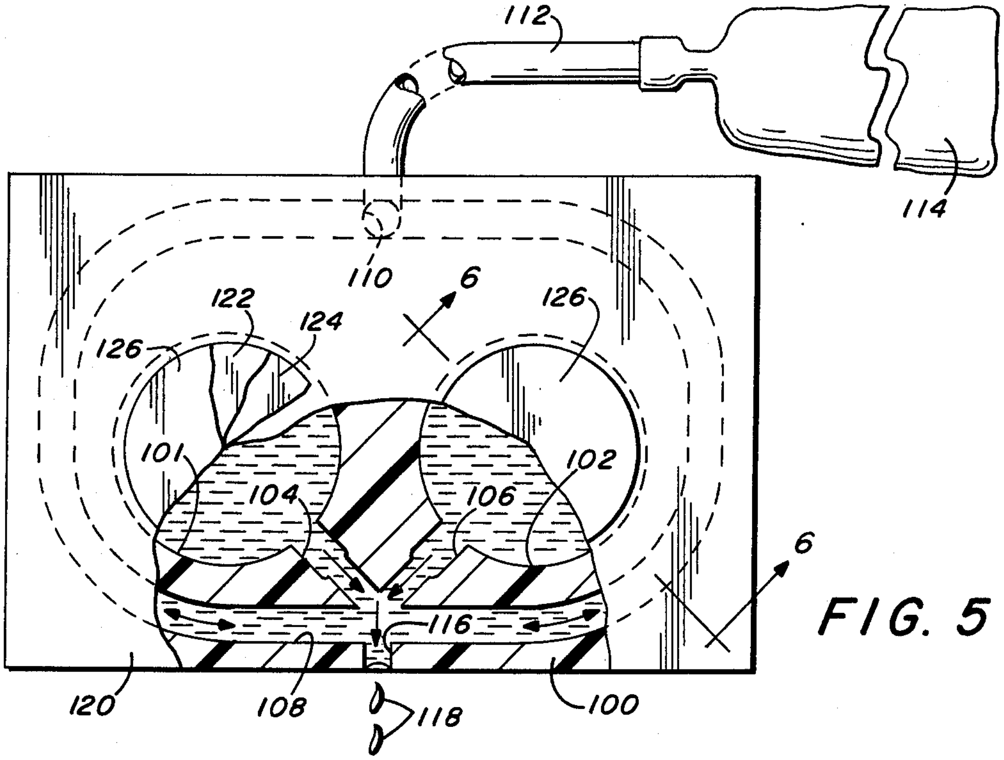
FIG. 5 is a cutaway view of a coincidence ink jet incorporating the principle of the invention.
Figure 6:
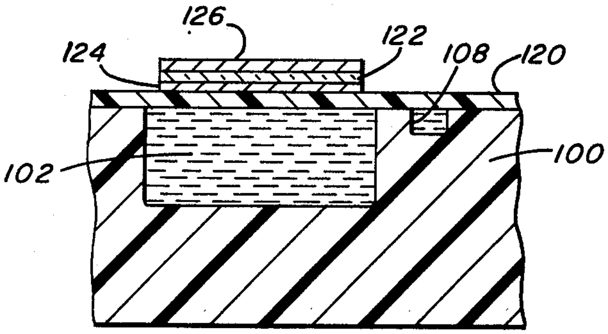
FIG. 6 is a view taken along section line 6—6 of FIG. 5.

Referring to FIGS. 5 and 6, there is illustrated a coincidence ink jet assembly to which the principle of this invention may also apply. A coincidence jet assembly is the subject matter of copending U.S. application, Ser. No. 625,988, Filed Oct. 28, 1975, now abandoned "Coincidence Ink Jet", (common assignee), and comprises two liquid ink pressure passages and a droplet outlet orifice. Each of the pressure passages is communicated to a respective pressure chamber. An ink droplet is expressed from the outlet orifice only when the liquid in both the pressure passages has a simultaneous increase in pressure.

Referring to FIG. 5, a cutaway view of one member 100 of an ink jet housing assembly is shown, which has provided therein a pair of pressure chambers 101 and 102. Fluid pressure passages 104 and 106 lead from the chambers 101, 102, respectively, to a liquid ink supply passage 108 where the three passages intersect. The liquid ink supply passage 108 is communicated to a port 110, which in turn is communicated through a conduit 112 to an ink supply reservoir 114, located remotely from the housing, which comprises a sealed flexible bag. Also, at the intersection is an outlet orifice 116 through which ink droplets 118 are expressed onto a copy medium.

Referring to FIG. 6, the chambers and passages are sealed by a flat flexible layer 120 bonded to the member 100. The pressure chambers 101, 102 and passages 104, 106 and 108 are completely filled with liquid ink. A piezoelectric ceramic member 122 is sandwiched between and bonded to a pair of electrodes 124 and 126 with the electrode 124 being bonded to the layer 120 thereby effectively bonding the piezoelectric member 122 thereto. The members 100 and 120 of the housing may be glass or plastic.

When the piezoelectric member for either transducer 101 or 102 is activated, a fluid pressure pulse will occur in a respective one of passages 104 and 106 causing displacement of ink along the respective passage. The passages 104 and 106 are at such an angle relative to the orifice 116, the impedance to liquid flow in passage 108 relative to the impedance to liquid flow in orifice 116, and the magnitude and duration of a pressure increase exerted to the liquid in the pressure chambers 101, 102 are designed that the ink stream expressed from only one passage at a time will entirely miss orifice 116 and displace the ink in the ink supply passage 108 while the ink within orifice 116 will not be disturbed to the extent of expressing a droplet therethrough. The orifice 116 is so located relative to the intersection of the passages 104, 106 and the magnitude and duration of the pressure increase exerted on the liquid in the pressure chambers 101, 102 are so designed that the summation vector of the fluid momentum vectors in passges 104 and 106 will lie on the axis of the orifice 116. Thus, only when the piezolectric members for both pressure chambers 101, 102 are simultaneously activated, thereby applying a simultaneous pressure increase in the liquid in each of passages 104, 106, will an ink droplet 118 be expressed from orifice 116.

A time-delayed second voltage is applied to the piezoelectric plate of a respective chamber after a first voltage is applied thereto to create a second pressure increase in a respective chamber to effect a pressure front, which arrives within an effective meniscus dampening vicinity of the orifice 116 at substantially the same instant that a droplet leaves the orifice 116 to dampen substantially the full period of meniscus vibration. The voltage magnitude and duration will be such that the magnitude of the combined second pressure increase in the liquid in both chambers will not be of a magnitude to express a droplet through orifice 116.

When a voltage is applied to a piezoelectric plate of only one pressure chamber at a time resulting in a jet stream being expressed from either passage 104 or 106, there is a slight effect on the meniscus in orifice 116, which causes the same to vibrate. The corresponding pressure front created by a time-delayed application of voltage to the same piezoelectric plate will act to dampen such vibration to stabilize the meniscus in the orifice 116 prior to the next voltage application to the piezoelectric plate of the same chambers.

Rather than apply a time-delayed second voltage to the piezoelectric plates of both chambers 101 and 102, the second voltage may be applied to the piezoelectric plate of only one chamber. Since both chambers must be simultaneously pressurized to express an ink droplet, a second pressure increase in only one of the chambers can be designed to dampen the meniscus vibration.

The aforedescribed coincidence ink jet has specific utilization in a matrix actuation system where either a large number of jets or a dense linear jet array is employed since substantially fewer pressure chambers than the number of jets utilized are required. Theoretically, since two independent pressure chambers are required to effect expression of an ink droplet through a jet, the number of pressure chambers required in a matrix actuation system is twice the square root of the number of jets. For example, theoretically, only 120 pressure chambers are needed for 3600 jets with each jet orifice being communicated to two pressure chambers. However, as the number of jets increases in a system, the number of jets communicated to one pressure chamber will be hydraulically limited and, therefore, more pressure chambers may be required. For instance, the practical number of pressure chambers for a 3600-jet assembly may range between 120 and 400. In this instance, a housing would be provided with a plurality of pressure chambers, each serving a number of ink jets.

In all of the above embodiments, the housing and membranes may comprise any well-known material such as plastic, glass or ceramic.

What is claimed is:

1. An ink jet assembly comprising: a droplet outlet orifice; a droplet producing pressure chamber means operatively communicated with said orifice to express a liquid droplet therethrough; means responsive to electrical pulses to effect a pressure increase in said chamber means; first means for effecting a first electrical pulse at said responsive means to effect a first pressure increase in the liquid in said chamber means; second means for effecting a second electrical pulse, which is separate from said first pulse, at said responsive means for effecting a second pressure increase in the liquid in said chamber means at a predetermined instant after said first pressure increase; the magnitude and duration of said first electrical pulse effecting said first pressure increase of such nature to express a liquid droplet from said droplet outlet orifice; the expression of a droplet from said droplet outlet orifice resulting in an inherent vibration amplitude of the meniscus formed in said outlet orifice after the droplet leaves therefrom; the predetermined instant, the magnitude and duration of said second electrical pulse effecting said second pressure increase of such nature to provide a pressure front at an effective meniscus dampening zone at substantially the instant the droplet leaves said orifice to substantially dampen the inherent vibration amplitude of the meniscus and decrease the period of meniscus stabilization.

2. The structure as recited in claim 1 wherein said second electrical pulse is applied after substantial decay of said first electrical pulse.

3. The structure as recited in claim 1 wherein the magnitude and duration of said second electrical pulse is less than that of said first electrical pulse.

4. The structure as recited in claim 1 wherein said chamber means is one chamber, an outlet passage means communicates said pressure chamber to said droplet outlet orifice, a fluid supply chamber means, said droplet orifice being communicated with said fluid supply chamber means, said outlet passage means opening into said fluid supply chamber means, said fluid supply chamber means being located between said droplet outlet orifice and said outlet passage means.

5. The structure as recited in claim 1 wherein said pressure chamber means comprises two pressure chambers, each having an outlet passage means communicating said pressure chambers to said droplet outlet orifice, said outlet passage means intersecting each other adjacent said droplet outlet orifice, said outlet passage means and said outlet orifice being arranged relative to each other that a droplet is expressed from said orifice only when the liquid in said two chambers has a simultaneous pressure increase.

6. The structure as recited in claim 5 further comprising a fluid supply chamber means, said droplet outlet orifice being communicated with said fluid supply chamber means, said outlet passage means opening into said fluid supply chamber means, said fluid supply chamber means being located between said outlet orifice and said outlet passage means.

7. The structure as recited in claim 5 wherein said second pressure increase occurs simultaneously in the liquid in each of said pressure chambers.

8. The structure as recited in claim 5 wherein said second pressure increase occurs in the liquid in at least one of said pressure chambers.

9. The structure as recited in claim 1 wherein said chamber means is one chamber.

10. The structure as recited in claim 1 wherein said pressure chamber means comprises two pressure chambers, each having an outlet passage means communicating said pressure chambers to said droplet outlet orifice; said pressure chambers, outlet passage means and orifice being so arranged and constructed that a droplet is expressed from said orifice only when the liquid in said two chambers is pressurized at the same time.

11. The structure as recited in claim 10 wherein said second pressure increase occurs in the liquid in at least one of said pressure chambers.

12. A method for dampening a meniscus vibration amplitude in a liquid drop generator comprising: effecting a first pressure to express a liquid droplet through an outlet orifice by actuating a tranducer means, said expression of the droplet by the first pressure resulting in an inherent meniscus vibration amplitude after the droplet leaves the orifice, substantially dampening said inherent meniscus vibration amplitude and thereby decreasing the period of meniscus stabilization by actuating the same transducer means a predetermined instant after the first named actuation thereof and generating a pressure front of such magnitude and duration within an effective meniscus dampening vicinity of the outlet orifice at substantially the same instant the droplet leaves the orifice.

13. A method for dampening a meniscus vibration amplitude in a liquid drop generator comprising: effecting a first pressure to express a liquid droplet through an outlet orifice by actuating two transducer means, said expression of the droplet by the first pressure resulting in an inherent meniscus vibration amplitude after the droplet leaves the orifice, substantially dampening said inherent meniscus vibration amplitude and thereby decreasing the period of meniscus stabilization by actuating at least one of said two transducer means a predetermined instant after the first named actuation thereof and generating a pressure front of such magnitude and duration within an effective meniscus dampening vicinity of the outlet orifice at substantially the same instant the droplet leaves the orifice.

* * * * *